United States Patent
Hauki et al.

(10) Patent No.: US 6,361,082 B1
(45) Date of Patent: Mar. 26, 2002

(54) PIPE COUPLING

(75) Inventors: Peter Hauki, Herrigårdsflygeln; Yngve Lundequist, Enebbavägen; Rauno Asplund, Trädgårdsgatan, all of (SE)

(73) Assignee: Wirsbo Bruks AB, Virsbo (SE)

( * ) Notice: Subject to any disclaimer, the term of this patent is extended or adjusted under 35 U.S.C. 154(b) by 0 days.

(21) Appl. No.: 09/720,968

(22) PCT Filed: Jun. 24, 1999

(86) PCT No.: PCT/SE99/01151

§ 371 Date: Jan. 3, 2001

§ 102(e) Date: Jan. 3, 2001

(87) PCT Pub. No.: WO00/01973

PCT Pub. Date: Jan. 13, 2000

(51) Int. Cl.[7] .................................................. F16L 33/22
(52) U.S. Cl. .................... 285/253; 285/148.27; 24/279
(58) Field of Search .......................... 285/148.27, 253, 285/252, 279, 20 LS

(56) References Cited

U.S. PATENT DOCUMENTS

| | | | |
|---|---|---|---|
| 1,039,584 A | | 9/1912 | Parsons |
| 1,286,388 A | * | 12/1918 | Mulconroy ............... 285/253 |
| 2,285,850 A | | 6/1942 | Weeks |
| 2,749,150 A | * | 6/1956 | Kaiser ................... 258/148.27 |
| 3,087,221 A | | 4/1963 | Armstrong |
| 4,039,212 A | | 8/1977 | Skarud |
| 4,305,179 A | * | 12/1981 | Sakurada ................ 24/20 R |
| 4,490,888 A | * | 1/1985 | Levant ................... 285/148.27 |
| 4,556,241 A | | 12/1985 | Weinhold |
| 4,758,029 A | * | 7/1988 | Davis ..................... 285/253 |

FOREIGN PATENT DOCUMENTS

| | | | | |
|---|---|---|---|---|
| DE | 5637 | * | 5/1951 | ........ 285/FOR 160 |
| DE | 42 43 848 A1 | | 6/1994 | |
| EP | 0 849 519 A1 | | 6/1998 | |

* cited by examiner

*Primary Examiner*—Eric K. Nicholson
(74) *Attorney, Agent, or Firm*—Browdy and Neimark P.L.L.C.

(57) ABSTRACT

The present invention relates to a pipe coupling for connection to a pipe end of a pipe made of polymer material and intended preferably for tap water or heating installations. The pipe coupling includes an inner sleeve intended for insertion into the pipe end and for abutment with the inner surface of said pipe end. The coupling further includes an outer sleeve intended for abutment with the outer surface of said pipe end. The outer sleeve is provided with a slot-like opening and means for adjusting the width of said opening. When the outer sleeve is in a tightened, adjusted state, the sleeve will be internally and externally cylindrical. A center axis through the outer cylindrical surface of the outer sleeve is spaced at a distance from a center axis through the inner cylindrical surface of the outer sleeve. In the tightened, adjusted state of the outer sleeve, the internal radius of said sleeve is smaller than the external radius of said pipe end.

11 Claims, 4 Drawing Sheets

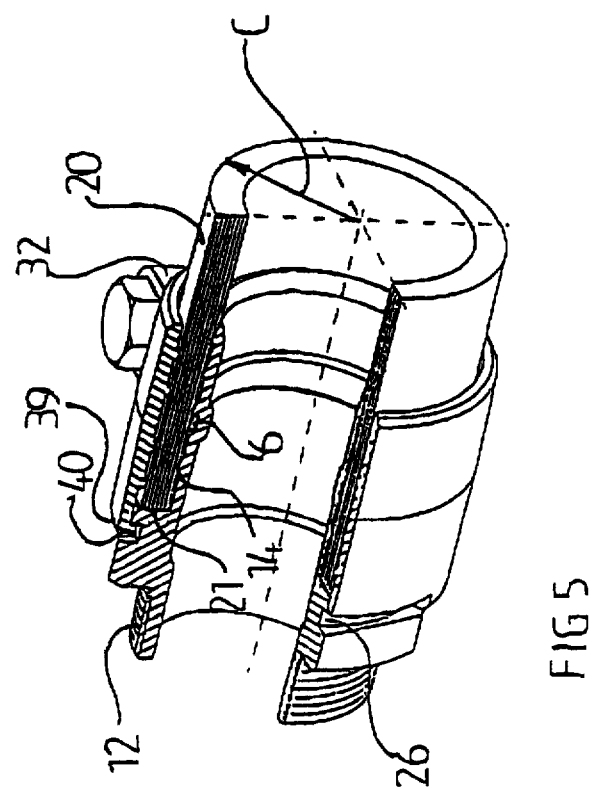
FIG 5
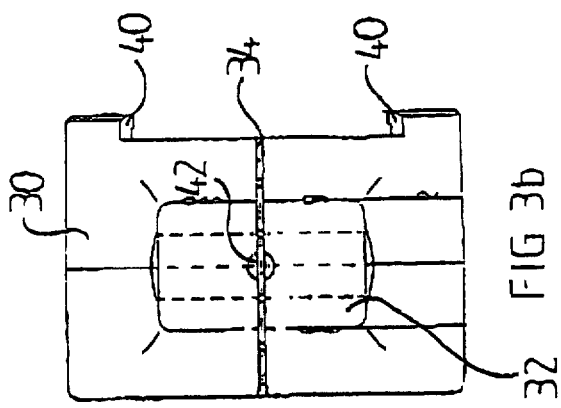
FIG 3b
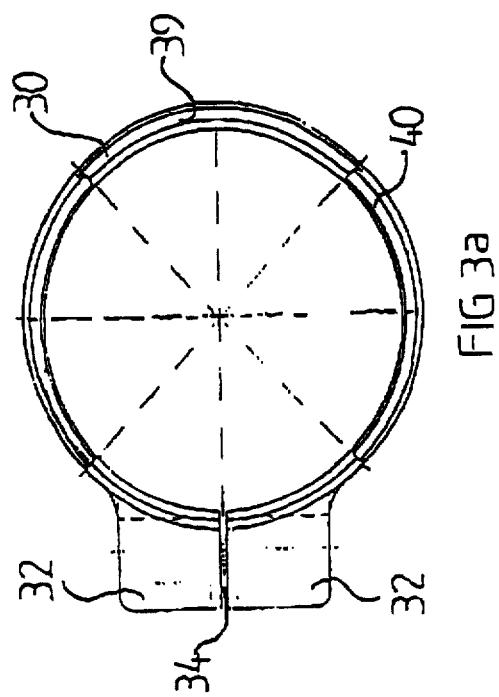
FIG 3a
FIG 3c

PIPE COUPLING

The present application is the national stage under 35 U.S.C. 371 of PCT/SE99/01151, filed Jun. 24, 1999.

TECHNICAL FIELD OF THE INVENTION

The present invention relates to a pipe coupling for connection to a pipe end of a plastic pipe, said pipe preferably being used in tap water or heating installations. The coupling includes an inner sleeve for insertion into said pipe end into abutment with the inner surface thereof, and an outer sleeve which is intended to lie in abutment with the outer surface of said pipe end and which includes a slot-like opening and means for adjusting the size of said opening.

BACKGROUND OF THE INVENTION

A metal pipe coupling for interconnecting cross-linked polyethylene pipes installed in hot and cold water systems and in central and district heating pipe systems is known to the art from U.S. Pat. No. 4,039,212. This pipe coupling is of the kind described in the introduction and is available in various versions designed to handle different pipe pressures, However, because of successively stricter approval standards ordained by the relevant authorities, decreeing that the coupling joint shall be stronger than the pipe itself, has meant that these pipe couplings are unable to meet satisfactorily certain test requirements, such as pullout tests, load tests and other functional tests carried out in practice. A common drawback with these earlier known versions is that the couplings do not exert an evenly distributed clamping force around the full periphery of the pipe, that the couplings cannot be adjusted uniformly to provide a tight and sealed join, and that they require detailed fitting instructions and continuous monitoring of the tightening force.

SUMMARY OF THE INVENTIVE CONCEPT

An object of the present invention is to provide a pipe coupling which, in one and the same version, can manage different pipe pressures, which will fulfill the load and function requirements applicable to these types of couplings, which can be fitted easily and quickly, and which does not require the use of large and special tools in order to fit the coupling.

This object is achieved in accordance with the invention, with a coupling that has the features set forth in the accompanying claims,

BRIEF DESCRIPTION OF THE ATTACHED DRAWINGS

The invention will now be described in more detail with reference to the accompanying drawings, in which FIG. 1 is an exploded view of one embodiment of an inventive pipe coupling;

FIG. 2a is a side view partially in cross-section, and FIG. 2b is a perspective view partially in cross-section;

FIGS. 3a–3c illustrate the outer sleeve of FIG. 1, of which FIGS. 3a–3b are different side views and FIG. 3c is a cross-sectional view;

FIG. 5 is a perspective, partially cross-sectional view of the pipe coupling of FIG. 1 fitted to one end of a pipe.

DETAILED DESCRIPTION OF A PREFERRED EMBODIMENT OF THE INVENTION

Figure 1:
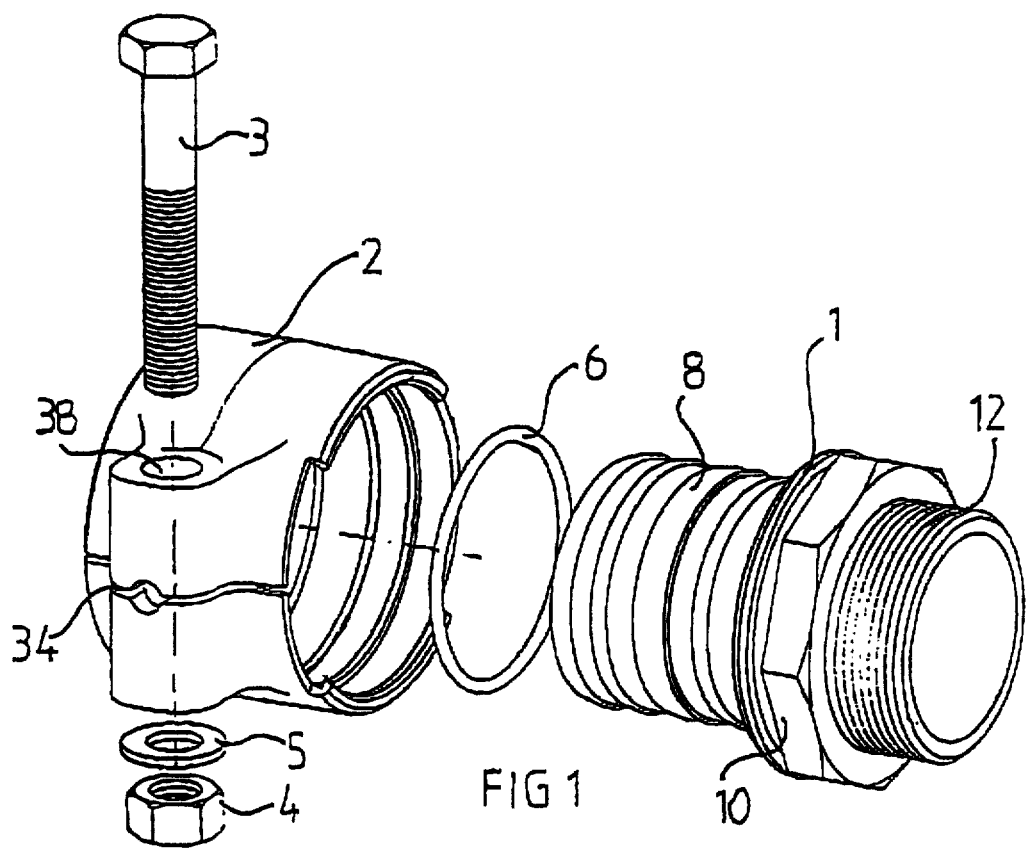

FIG. 1 illustrates the component parts of the inventive coupling, these component parts including an inner sleeve 1, an outer sleeve 2, a screw 3, a nut 4, a washer 5 and an O-ring 6.

Figure 2B:
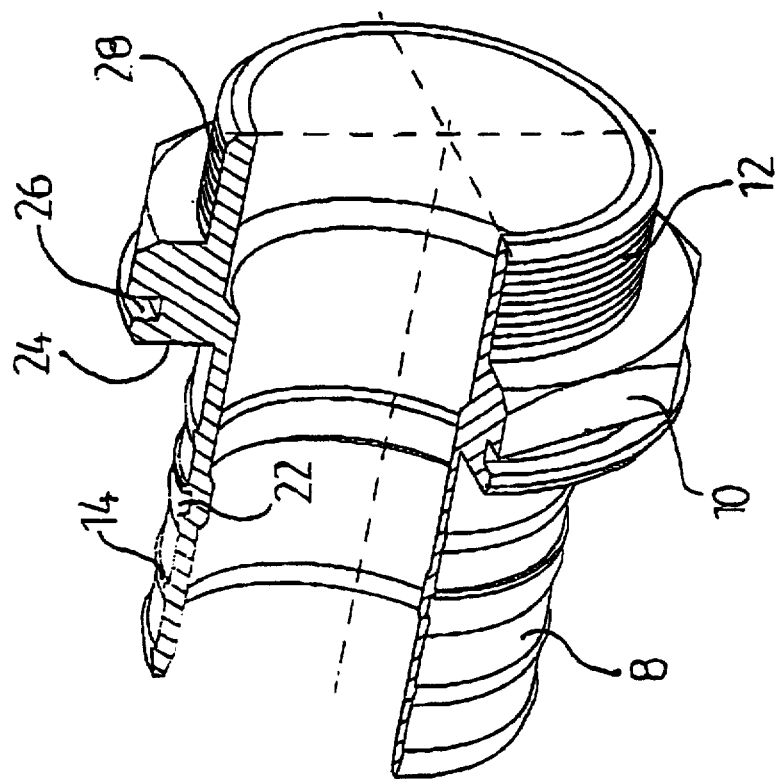
FIGS. 2a–2b illustrate the inner sleeve of FIG. 1, of which Figures
Figure 2A:
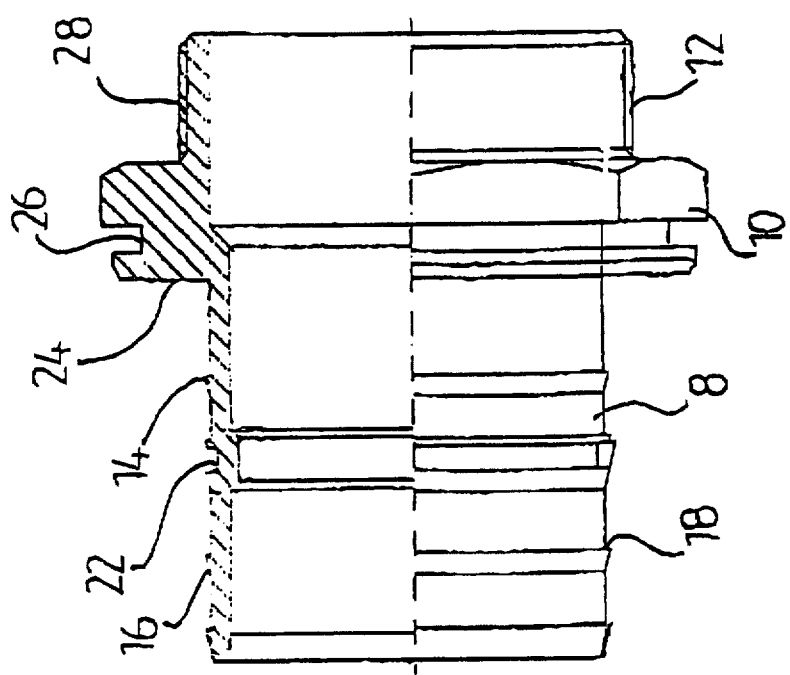

The inner sleeve 1, which is shown in more detail in FIGS. 2a–2b, is manufactured from a suitable material in the present context, preferably from a metallic material, although other materials may be suitable, such as various polymer materials, for instance. Particularly suitable inner sleeve materials are sand-moulded and cast brass alloys.

The inner sleeve 1 is designed for connection to another coupling part and shall also afford an effective gripping and sealing function against the formable and ductile pipe wall and shall be capable of being locked to the outer sleeve. Accordingly, the inner sleeve includes a gripping and sealing part 8, a locking part 10, and a connecting part 12.

The gripping and sealing part 8 of the inner sleeve, against which the ductile pipe wall is intended to abut, is provided with one or preferably more gripping ridges 14. The gripping ridge or ridges 14 includes/include a first side surface 16 which is slightly inclined so as to enable the pipe 20 to be fitted onto the inner sleeve 1 more easily, and a second side surface 18 which slopes abruptly to form an edge which provides an effective gripping and sealing function. The gripping and sealing part 8 also includes a groove 22 for receiving the O-ring 6. The gripping and sealing part 8 of the inner sleeve is designed for coaction with the inner surface of the outer sleeve 2, as described below in more detail with reference to FIGS. 5 and 6.

The locking part 10 on the inner sleeve 1 has an abutment edge 24 for abutment With the end 21 of the pipe fitted onto said sleeve. The locking part 10 also includes a circular locking groove 26 for coaction with the outer sleeve 2 in a manner to fixate and lock said sleeve, as described in more detail herebelow. The locking part 10 may have an outer octahedral shape or some other shape which will enable it to be gripped by a suitable tool.

The connection part 12 of the inner sleeve may be constructed in different ways, all in accordance with requirements, although it will include conveniently a conventional thread 28 for screw connection with another coupling part (not shown).

Figure 4:
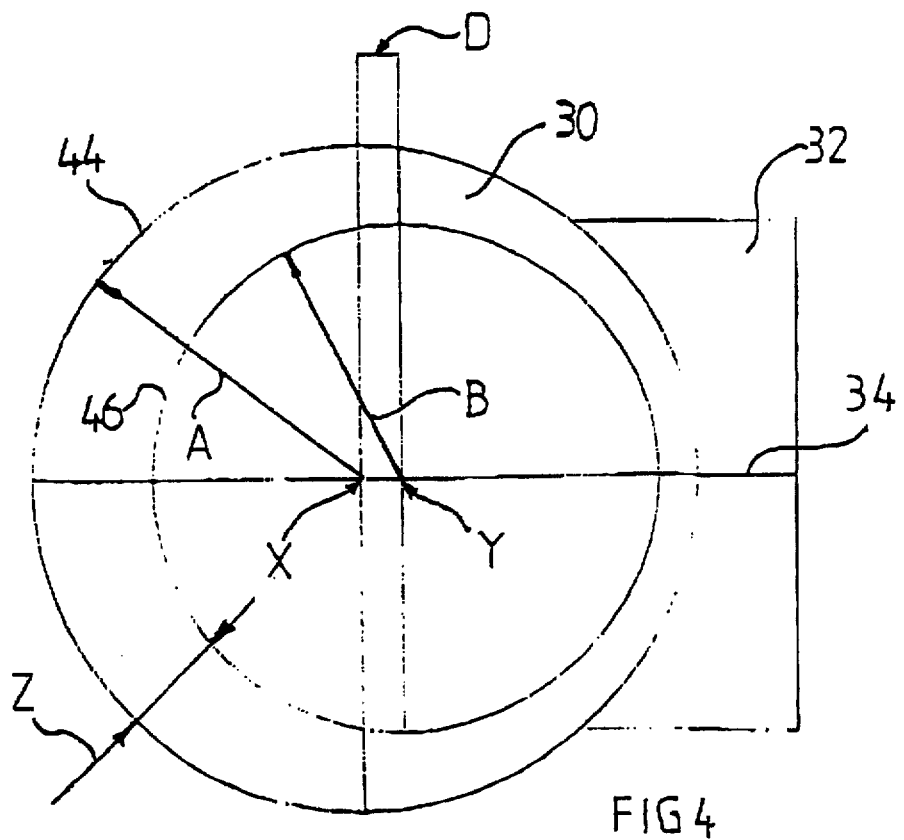
FIG. 4 is a schematic side view of the outer sleeve and for reasons of clarity illustrates the eccentricity in the sleeve in an exaggerated fashion.

The outer sleeve 2 is shown in more detail in FIGS. 3a–3c, and also schematically in FIG. 4. The outer sleeve is made from a material suitable for the purpose intended, preferably from a metallic material, such as a bronze alloy, although other materials are also conceivable in this context, such as polymer materials, for instance.

The outer sleeve 2 is constructed so as to enable it to exert a clamping force on the outside of the pipe and so that it can be locked to the inner sleeve 1 in the pull direction. The outer sleeve 2 comprises generally a clamping sleeve 30 that has a slot-like opening 34 and a jaw 32 on each side of said opening 34. As will best be seen from FIG. 3c, the inner surface of the sleeve intended for abutment with the outside of the pipe 20 includes abutment grooves 36. The jaws 32 include through-penetrating holes 38 (see also FIG. 1) through which the screw 3 passes. Arranged on one end-wall part 39 of the clamping sleeve 30 are two mutually opposing, part-circular locking shoulders 40 which are intended for coaction with the inner sleeve 1, as described in more detail below. The slot-like opening 34 includes a centrally arranged circular opening 42.

FIG. 4 is a schematic side view of the other end-wall part of the outer sleeve 2, and includes an exaggerated illustration of this end-wall part with the intention of illustrating the eccentric design of the clamping sleeve 30 more clearly. The outer sleeve 2 has a cylindrical outer surface 44 of radius A with a centre axis that passes through the point X, and a cylindrical inner surface 46 of radius B, with a centre axis that passes through the point Y. As will be seen from FIG. 4, the centre axis Y of the inner surface 46 of the clamping sleeve is offset through a distance D in relation to the centre axis X of the outer surface 44 of said clamping sleeve. The clamping sleeve 30 is thus constructed eccentrically and has a varying wall thickness Z which is greatest at the side opposite to said slot-like opening 34 and smallest at said slot-like opening. The distance D is about 0.5 mm in the illustrated case.

When manufacturing the outer sleeve 2, the inner surface 46 of said sleeve is first machined in a lathe to a measurement which corresponds to the diameter of the sleeve when the slot-like opening is fully closed, i.e. to a radius B that is smaller than the outer measurement of the pipe 20, i.e. smaller than the radius C (see FIG. 5). The slot-like opening 34 is then, and only then, cut into the sleeve. When the slot-like opening is fully closed, the measurement of the inner surface 46 will preferably be about 1–3.5 mm smaller than the outer diameter of the pipe, which means that the outer sleeve must be widened forcibly in order to enable it to be fitted over the end of the pipe.

Figure 6:
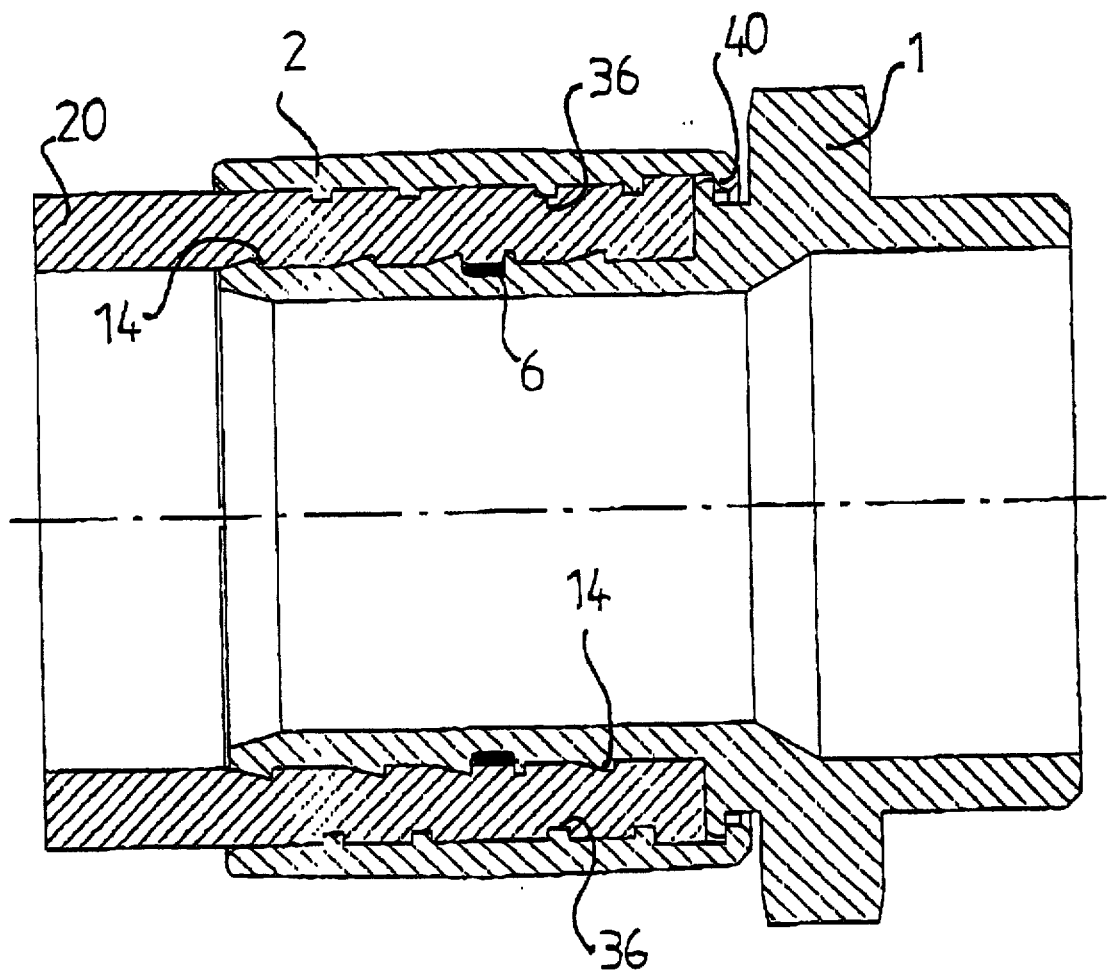
FIG. 6 is an enlarged axial cross-sectional view of the pipe coupling shown in FIG. 5.

FIGS. 5 and 6 show the inventive pipe coupling fitted to one end of a pipe 20. A first step in fitting the coupling to the pipe, as shown in FIG. 5 or FIG. 6, entails fitting the outer sleeve 2 onto the pipe 20 by widening the slot-like opening 34 in said sleeve, primarily to an extent sufficient to be able to push the sleeve onto the end of the pipe and secondarily to an extent such that the locking shoulders 40 will pass free when the inner sleeve is inserted into said pipe end, this widening of the slot-like opening 34 being achieved with a tool inserted into the locking-gap opening 42. The head of the screw 3 has a size which enables it to be used to hold the slot-like opening 34 in an appropriately widened state to this end. At this moment in time, the end-wall part 39 carrying the locking shoulders 40 shall face away from the pipe 20, as shown in FIG. 5. The eccentricity of the outer sleeve enables the slot-like opening 34 to be easily widened.

In a second step, the inner sleeve 1 is fitted into the end of the pipe, by pushing the gripping and sealing part 8 of the inner sleeve, said part carrying the O-ring 6 seated in groove 22, into the pipe end 20 so that the edge 21 of said pipe will lie in abutment with the abutment edge 24 on the locking part 10. The pipe 20 slides relatively smoothly over the slightly inclined side surfaces 16 on the gripping ridges 14.

In a third step, the outer sleeve 2 is pushed on the pipe 20 to a position in which the locking shoulders 40 will snap into the locking groove 26 in the inner sleeve 1 when the forcibly widened slot-like opening is allowed to return to its original state. The outer sleeve 2 is therewith secured in relation to the inner sleeve 1 and the pipe end 20.

The limited peripheral extension of the locking shoulders 40 and their distance from the slot-like opening 34 means that the slot-like opening need only be widened to a limited extent in order to fit the outer sleeve 2 onto the pipe end. In respect of those pipe sizes that are relevant in the present context, which may vary between 25–110 mm, the slot-like opening will need only be widened to between about 6–19 mm from a width of about 2 mm in its unaffected state.

In the last step of fitting the outer sleeve, the sleeve is tightened against the pipe 20 by inserting the screw 3 through the holes 38 and the washer 5 and screwing the nut 4 onto the screw and slowly tightening the screw until the jaws 32 are in abutment with one another and the slot-like opening is closed. No complicated mounting instructions or the use of complicated tools, such as torque wrenches, are required, since it is only necessary to tighten the nut and screw joint until the slot-like opening is fully closed, As before mentioned, the outer sleeve is machined to an inner diameter which corresponds to the diameter of the sleeve when in its tightened state, which means that the sleeve Will be essentially cylindrical when tightened. This is made possible since the outer sleeve need only be widened to a limited extent when fitting the sleeve, and by virtue of the eccentricity in the clamping sleeve creasing of the wall of the clamping sleeve is prevented when adjusting the slot-like opening, This results in a uniformly distributed clamping force and thus in a clamping force which is equally as great around the entire periphery of the pipe.

As will be seen from FIG. 6 (and also from FIG. 5), the inner sleeve 1, and its gripping ridges 14 in particular, abuts the inner surface of the pipe 20, and the outer sleeve 2, and its abutment grooves 36 in particular, abuts the outer surface of the pipe 20. In the fixated position of the outer sleeve 2 relative to the pipe 20 and the inner sleeve 1, as shown in FIG. 6, the gripping ridges 14 on the inner sleeve will abut with and press against the pipe between the grooves 36 on the outer sleeve, said ridges pressing against the pipe wall essentially centrally between the grooves 36. As the outer sleeve is tightened, the pipe material is pressed against the profiled gripping ridges 14 and is therewith shaped to the contours of said profiled ridges. This results in a very effective sealing and locking function that fulfils all prevailing standards and functional requirements relating to such couplings.

It will be noted that the aforedescribed preferred embodiment of the invention is only a non-limiting example and that the invention can be varied in many ways within the scope of the following claims. For instance, although the size of the slot-like opening in the preferred embodiment is given as being about 2 mm, it will be understood that this opening may be both narrower and wider within the scope of the invention, preferably between 0–10 mm, and that the slot width can be varied in accordance with the size of the pipe involved. Furthermore, although the eccentricity in the clamping sleeve of the illustrated embodiment has been given as about 0.5 mm, it will be understood that this distance is only an example and that the distance D may be either smaller or greater, for instance between 0.1–5.0 mm and may also vary further depending on the size of the pipe concerned. The number of gripping ridges and the number of abutment grooves can also vary and the gripping ridges and the grooves may both have a shape different to that illustrated, As before mentioned, the inventive pipe couplings are intended for use in water-carrying conduit systems. It will be understood, however, that they can also be used in conduit systems for conducting other substances, such as gas or petroleum, for instance.

What is claimed is:

1. A pipe coupling for connection to a pipe end of a pipe made of polymer material, comprising an inner sleeve (1) which is intended for insertion into the pipe end (20) and for abutment with the inner surface of said pipe end, an outer sleeve (2) separated from the inner sleeve (1) which is intended for abutment with the outer surface of said pipe end (20) and which includes a slot opening (34), and means (3, 4, 5, 32) for adjusting said opening (34), characterized in the outer sleeve (2) is cylindrical internally and externally when the slot-like opening (34) is fully closed, that the slot-like opening (34) is fully closed when the outer sleeve (2) is in a first, unaffected state as well as when the outer sleeve (2) is in a tightened adjusted state on the pipe end (20), that the internal radius (B) of said outer sleeve (2) in said first, unaffected state being smaller than the external radius (C) of said pipe end (20), that a center axis (X) through the outer cylindrical surface (44) of the outer sleeve (2) is spaced at a distance (D) from a center axis (Y) through the inner cylindrical surface (46) of the outer sleeve (2), that the inner sleeve (1) and the outer sleeve (2) are constructed so that they can be locked to each other, and that the outer sleeve (2) and the slot-like opening (34) are adapted to be widened forcibly from said first, unaffected state such that the outer sleeve (2) may be fitted over said pipe end (20) and said inner sleeve (1).

2. A pipe coupling according to claim 1, characterized in that the outer sleeve (2) includes one or more locking shoulders (40) intended for coaction with a locking groove (26) in the sleeve (1) for fixating the outer sleeve (2) in relation to the inner sleeve (1).

3. A pipe coupling according to claim 2, characterized in that said outer sleeve (2) is widened forcibly, primarily to an extent sufficient to be able to push the outer sleeve (2) onto the pipe end (20) and secondarily to an extent such that the locking shoulders (40) will pass free when the inner sleeve (1) is inserted into the pipe end (20).

4. A pipe coupling according to claim 3, characterized in that the locking shoulders (40) are disposed on the outer sleeve (2) at a distance from a plane that passes through the slot opening (34) in the outer sleeve.

5. A pipe coupling according to claim 4, characterized in that two mutually opposing locking shoulders (40) are provided on one end-wall (39) of the outer sleeve at the greatest possible distance from said plane passing through the slot opening (34) in the outer sleeve, each locking shoulder extending about ¼ of the circumference of the outer sleeve (2).

6. A pipe coupling according to claim 1, characterized in that said distance (D) is about 0.5 mm.

7. A pipe coupling according to claim 1, characterized in that the slot opening (34) is completely closed in a tightened, adjusted state.

8. A pipe coupling according to claim 1, characterized in that the inner sleeve includes a gripping part (8) which is intended for insertion into the pipe end (20) and for abutment with the inner surface of said pipe end, and which carries one or more gripping ridges (14).

9. A pipe coupling according to claim 8, characterized in that when seen in the direction of insertion of the inner sleeve (1) into the pipe end (20), the gripping ridges (14) have a slightly sloping first side surface (16) and an opening, abruptly sloping second side surface (18).

10. A pipe coupling according to claim 8, characterized in that the outer sleeve (2) includes abutment grooves (36) that abut the outer surface of the pipe end (20) between said gripping ridges (14).

11. A pipe coupling according to claim 1, characterized in that said opening-adjusting means (3, 4, 5, 32) includes a jaw (32) on each side of the slot opening (34) and on the outside of the outer sleeve, each jaw (32) having a through-penetrating hole (38) for receiving a screw (3) which as it is tightened causes the jaws (32) to be brought together and therewith close the opening (34).

* * * * *

UNITED STATES PATENT AND TRADEMARK OFFICE
CERTIFICATE OF CORRECTION

PATENT NO.     : 6,361,082 B1
DATED          : March 26, 2002
INVENTOR(S)    : Hauki et al.

It is certified that error appears in the above-identified patent and that said Letters Patent is hereby corrected as shown below:

<u>Title page,</u>
Item [75], delete "Herrigardsflygeln", "Enebbavagen" and "Tradgardsgatan" and insert after "all of" -- Virsbo --.

Signed and Sealed this

Twenty-fourth Day of September, 2002

*Attest:*

JAMES E. ROGAN
*Director of the United States Patent and Trademark Office*

*Attesting Officer*